United States Patent [19]
Schottler

[11] 3,745,844
[45] July 17, 1973

[54] VARIABLE SPEED DRIVE TRANSMISSION
[75] Inventor: Henry Schottler, North Riverside, Ill.
[73] Assignee: Roller Gear, Ltd., Zug, Zug, Switzerland
[22] Filed: Apr. 18, 1972
[21] Appl. No.: 245,060

[52] U.S. Cl. ................................ 74/198, 74/208
[51] Int. Cl. ..................... F16h 15/08, F16h 13/04
[58] Field of Search ................. 74/198, 200, 208

[56] References Cited
UNITED STATES PATENTS
2,590,800  3/1952  Stephenson ........................ 74/198
3,164,025  1/1965  Francisco, Jr. ...................... 74/200
3,229,538  1/1966  Schottler ............................ 74/198

Primary Examiner—Leonard H. Gerin
Attorney—Melvin F. Jager

[57] ABSTRACT

A variable speed friction drive transmission wherein the contact pressures between the drive elements are varied by means of a pressure regulator responsive to changes in the slippage between the drive elements and the torque load on the driven shaft.

10 Claims, 5 Drawing Figures

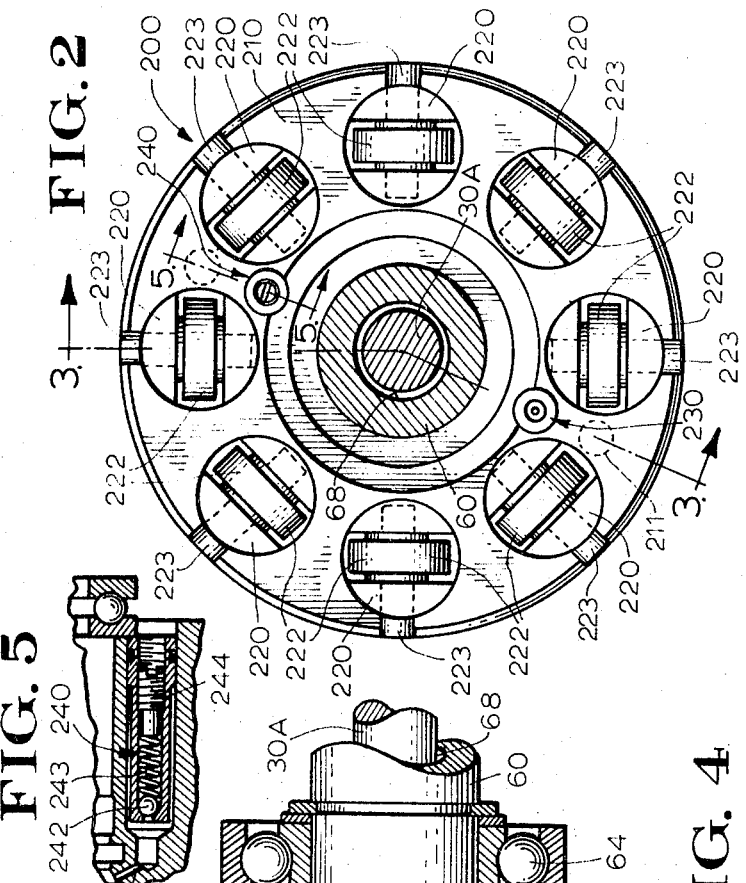
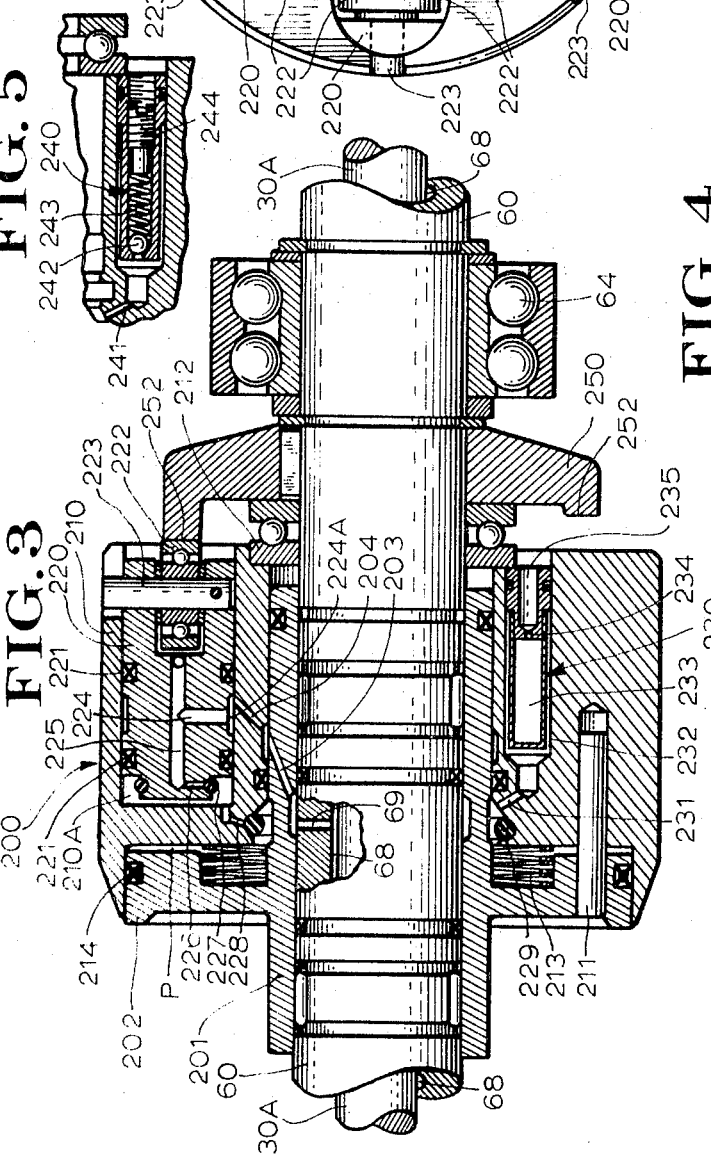
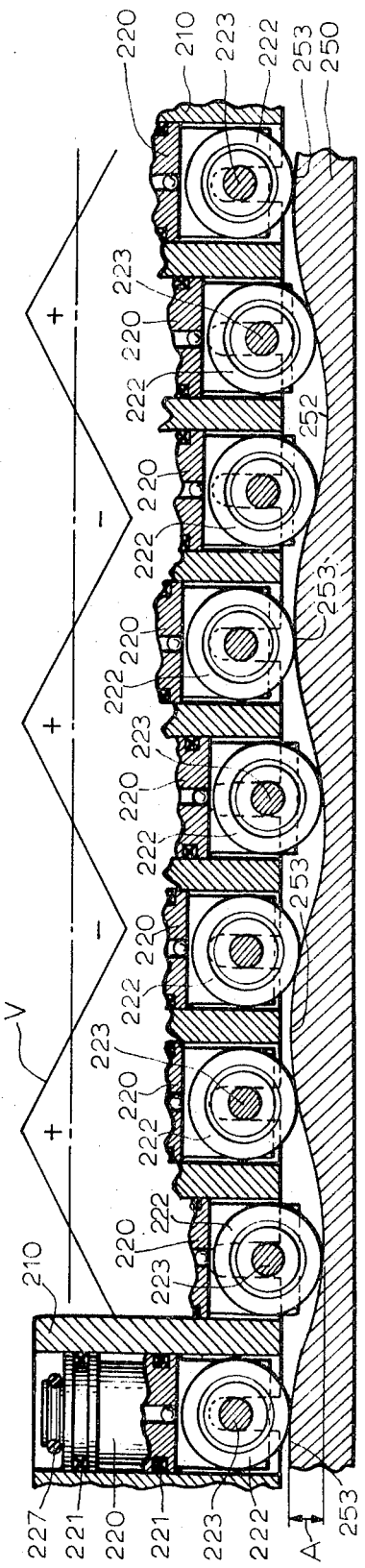

VARIABLE SPEED DRIVE TRANSMISSION

BACKGROUND AND GENERAL DESCRIPTION OF THE INVENTION

This invention relates generally to a variable speed drive transmission, and more particularly relates to an infinitely variable frictional drive transmission of the type incoprorating drive balls frictionally engaged between inner and outer ball races.

This invention relates to improvements in a mechanical infinitely variable friction drive transmission of the type disclosed and claimed in U.S. Letters Patent No. 3,229,538, entitled "Variable Speed Drive Transmission," which issued to the applicant herein on Jan. 18, 1966. As explained in said patent,there is a great need for a suitable frictional drive transmission capable of transmitting high torque loads between a drive and a drive shaft throughout a wide range of infinitely variable speed ratios, and under substantially positive non-slip drive conditions. Friction drive transmission of the type under consideration generally include a set of drive balls which frictionally engage with axially movable drive races. The relative positions of the balls and races can be varied to change the speed ratio of the unit to either increase or decrease the output speed. The friction drive transmission also includes a dynamic pressure regulator which controls the contact pressure between the drive balls and the drive races. The pressure regulator is designed to vary the contact pressure between the balls and races as the speed ratio and the output torque of the unit change, so that the contact pressure is maintained at the lowest possible level which assures substantially positive non-slip drive between the friction members for all conditions of operation of the transmission. By controlling the contact pressure in such a manner, the fatigue and friction forces applied to the components of the transmission are minimized for each output torque load. The life expectancy and the overall efficiency of the transmission unit are thereby maximized.

The present invention provides an improved hydraluc pressure regulator system for incorporation in a variable speed drive transmission of the type disclosed in said U.S. Pat No. 3,229,538. Generally, the improved pressure regulator in accordance with the present invention provides uniform application of contact pressure to the contact areas between the drive balls and the races of the transmission. The pressure regulator in accordance with the present invention also utilizes low hydralic pressures within a closed fluid system to provide the necessary contact pressure between the drive balls and races needed to assure positive, non-slip friction driving between the input shaft and the output shaft of the transmission. The closed fluid system permits the fluid pressures and thence the ball and race contact pressures to be regulated accurately. Moreover, the design of the transmission of the present invention reduces the possibility of large shock loads resulting from a sudden change in the torque load applied to the output shaft of the unit. The reduction of the shock load and the use of low hydraulic pressure results in a substantial increase in the life expectancy of components of the transmission unit.

The friction drive transmission including the pressure regulator of the present invention furthermore has increased mechanical efficiency and reduced friction losses. The preferred design isolates the pressure regulator from the axial thrust loads applied to the drive balls and races, and thereby permits the pressure regulator to be more sensitive in responding to the changes in torque load, oil viscosity, speed ratios and the like, during the operation of the transmission. The sensitivity of the pressure regulator is also enhanced by the use of the closed hydraulic system.

Briefly described, the variable speed friction drive transmission in accordance with this invention includes an improved pressure regulator for varying the contact pressures between drive balls and races of a friction drive system in response to slippage between the drive elements and further in response to variations in the torque load on the drive shaft.

EXEMPLARY EMBODIMENT

Further objects and advantages of the present invention will become apparent from the following description of an embodiment thereof, taken in conjunction with the accompanying drawings in which:

FIG. 2 is a cross-sectional view of the pressure regulator embodied in the transmission, as viewed along the line 2—2 in FIG. 1;

FIG. 3 is a removed and enlarged cross-sectional elevational view of the pressure regulator embodied in the transmission in accordance with the present invention;

FIG. 4 is a development illustrating the operation of the cam and piston drive mechanism embodied in the pressure regulator; and FIG. 5 is a removed and enlarged cross-sectional view of a safety valve assembly embodied in the pressure regulator of the present invention.

Figure 1:
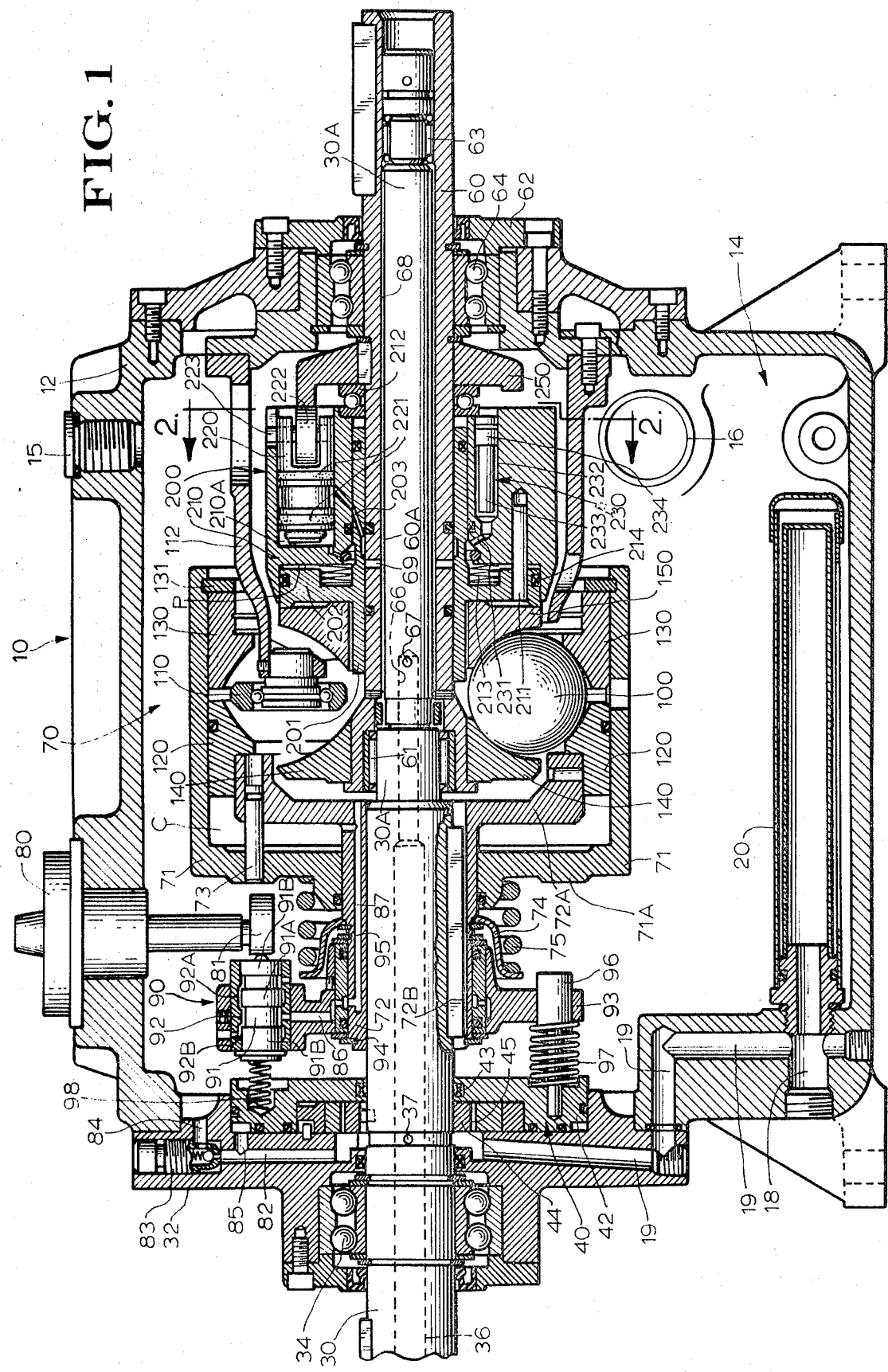
FIG. 1 is a cross-sectional elevational view of a friction drive transmission including the improved pressure regulator in accordance with the present invention.

The variable speed friction drive transmission in accordance with this invention is generally indicated in FIG. 1 by the reference numeral 10. The transmission 10 includes a closed housing 12 defining a substantial oil sump 14.

An access plug 15 is provided at the top of the housing 12 to permit the sump 14 to be filled with the necessary volume of oil. An inspection port 16 is positioned to allow a visual reading of the oil volume in the sump 14. The housing 12 also includes an oil exit port 18 through which the oil stored in the sump 14 is pumped to operate the various hydraulically controlled systems, and to lubricate the components of the transmission 10. An oil filter 20 is connected to the port 18 to filter the oil pumped from the sump 14.

The transmission 10 also includes coaxial imput and output shafts 30 and 60 respectively. Removable cover plates 32 and 62 on the adjacent ends of the transmission housing 12 support the imput shaft 30 and the output shaft 60 for rotation within suitable ball-bearing assemblies 34 and 64, respectively. In the illustrated embodiment, the inner end 30A of the imput shaft 30 has a reduced diameter, and is received within an axial bore 60A provided in the aligned output shaft 60. Suitable needle bearings 60 and 63 in the bore 60A receive the imput shaft portion 30A, and maintain the shafts 30 and 60 in coaxial alignment during rotation An axial bore in the shaft 30 defines an oil channel 36 for receiving a continuous stream of oil pumped from the sump 14. The output shaft 60 similarly includes an axial bore which defines a fluid channel 66 in axial alignment with the channel 36 defined in the imput shaft 30. A radial bore 37 provided in the imput shaft 30 places the aligned fluid channels 36 and 66 in fluid communication with the sump 14 through fluid channels 19 defined in the transmission housing 12.

The tolerance between the reduced imput shaft portion 30A and the bore 60A provided in the shaft 60 defines an annular fluid channel 68. A radial bore 67 joins the axial oil channel 66 to the annular fluid channel 68.

The transmission 10 in accordance with this invention also includes a suitable pump 40 for pumping the transmission oil from the sump 14 into the fluid channels 36 and 66 for use in controlling and lubricating the components of the transmission. In the preferred embodiment the pump 40 is a positive displacement gear-type pump for cpmpactness. The pump 40 includes a pump housing 42 secured from rotation to the transmission housing 12. Suitable sealing rings 43 seal the interior of the pump housing 42 around the shaft 30. Suitable gears 44 are secured to the imput shaft 30 in a manner which causes the gears to rotate relative to the housing 42 during the rotation of the imput shaft 30. The rotation of the gears 44 causes the pump 40 to draw oil from the sump 14 through the filter 20 and the channels 19, into an intake port 45 defined on the pump. The pump 40 subsequently discharges the fluid through a discharge port 46 to thereby supply oil through the radial bore 37 to the axial fluid channels 36 and 66, and into the annular channel 68.

The transmission 10 in accordance with this invention also includes a friction drive assembly 70 for transmitting the torque force of the imput shaft 30 to the output shaft 60 with selectively varying speed changing ratios. Generally, as described in detail in the aforementioned U.S. Pat. No. 3,229,538, the friction drive assembly 70 includes a plurality of spherical drive balls 100, preferably three in number, which are spaced uniformly around the aligned imput shaft 30 and output shaft 60. The balls 100 are retained in position by spacing rollers 110 which are fixed to the housing 12 by a bracket member 112. The rollers 110 restrain the balls from planetary movement with respect to the shafts 30 and 60 during the operation of the transmission 10. The drive balls 100 in the friction drive assembly 70 are positioned to frictionally engage with a pair of co-axially aligned angular imput races 120 and 130, and a pair of co-axially aligned annular output races 140 and 150. As indicated in FIG. 1, the imput races 120 and 130 are arranged to engage the outer portions of the drive balls 100, and the output races 140 and 150 are positioned to engage the inner portions of the balls 100, during the operation of the friction drive assembly 70.

The friction drive assembly 70 includes a cylindrical bushing 72 having an annular flange portion 72A. The bushing 72 is joined for rotation to the imput shaft 30 by a key 72B. The key connection between the shaft 30 and the bushing 72 permits the bushing to slide axially with respect to the shaft. The left outer imput race 120 is press fit onto the flange portion 72A of the bushing 72. The outer race 120 will thereby slide axially with respect to the imput shaft 30, and will rotate in unison with the shaft 30, through the bushing 72.

The friction drive assembly 70 in accordance with this invention also includes a cylindrical imput race carrier 71. The carrier 71 is concentric to the shafts 30 and 60, and engages the periphery of the outer imput races 120 and 130. A radial hub portion 71A of the carrier 71 is extended around the bushing 72. pins 73 joins the carrier 71 to the bushing flange 72A. The carrier 71 will thereby rotate in unison with the bushing 72 and the imput shaft 30. This arrangement also permits the carrier 71 to translate axially on the pin 73 with respect to the bushing 72 and the connected imput race 120.

The race 120, the bushing flange 72A and the carrier 71 thereby define an annular fluid chamber C which has a volume determined by the relative axial position of the bushing 72 with respect to the carrier 71. A spring retainer 74 is secured to the bushing 72 and engages a compression spring 75. The spring 75 functions to bias the carrier 71 to the right FIG. 1 with respect to the bushing 72. The spring 75 pre-loads the components of the friction drive assembly 70 so that the fluid in the chamber C is maintained under pressure.

The outer imput race 130 is joined by a retainer 131 to the carrier 71. The retainer 131 prevents any rightward movement of the race 130 with respect to the carrier 71. In the same regard, the pressure created by the drive balls 100 controls the leftward movement of the race 130. The spring 75 tends to separate the outer imput races 120 and 130 by urging the carrier 71 and the race 130 to the right with respect to the race 130 and the bushing 72.

The left inner output race 140 is secured to the end of the output shaft 60 by a press-fit connection, or other suitable means. The race 140 is thereby axially fixed during the operation of the unit 10, and will rotate in unison with the output shaft 60. The right inner output race 150 is connected to the output shaft 60 by means of the pressure regulator 200 in accordance with this invention. As explained further below, the races 140 and 150 co-operative with the drive balls 100 to transmit torque from the imput shaft 30 to the output shaft 60. The pressure regulator 200 functions to apply a varying axial force to the race 150 which provides the optimum contact pressure for the balls 100 and the races 120, 130, 140 and 150 for each speed ratio setting of the transmission 10.

The tranmission 10 includes a system for infinitely varying the axial relationship of the races 120, 130, 140 and 150 to thereby infinitely vary the speed changing ratio of the unit. In this regard, the transmission 10 includes a control knob 80 which carries a gradiantly varying control cam 81. The cam 81 is positioned within the transmission housing 12 in axial alignment with a self-centering spool valve 90. The valve 90 includes an axially movable piston 91 positioned in a cylinder 92 defined in a valve bracket 93. The bracket 93 is retained on the housing 72 by a pair of retaining rings 94 and 95. The connection between the bushing 72 and the bracket 93 permits the bracket to slide axially with respect to the imput shaft 30 in unison with the busing 72. Since the bushing 72 is securely joined to the right outer imput race 120, the valve bracket 93 thereby moves in unison with the race 120. A positioning pin 96 connects the bracket 93 to the non-rotatable pump housing 42, to restrain the bracket from rotation. A positioning spring 97 biases the bracket 93 to the right in FIG. 1. A compression spring 98 is extended between the pump housing 42 and the bracket 93 to bias the piston 91 to the right in FIG. 1 into engagement against the control cam 81.

During the operation of the transmission 10 the control valve 90 is supplied with a continuous flow of oil from the sump 14 by means of the pump 40. A portion of the output of the pump 40 is directed into a channel 82 provided in the housing 12. A ball-type check valve 83 is provided in the channel 82 to operate as a safety release if the oil pressures in the transmission 10 reach a predetermined maximum limit. If the set pressure limit is exceeded, the check valve 83 opens to discharge the high-pressure oil through a discharge orfice 84. The oil then drains back into the sump 14. Under normal conditions, the oil in the channel 82 flows into a horizontal conduit 85 (a portion of which is shown) into a groove 92A provided in the cylinder 92. The oil flows from the groove 92A into the cylinder 92 and through an outletport 86 provided in the bracket 93. A conduit 87 provided in the bushing 72 connects the port 86 to the hydraulic pressure chamber C. The volume and pressure of the oil flowing into chamber C from cylinder 92 depends upon the relative positioning of the bracket 93 and the piston 91, as controlled by the setting of the control cam 81. The resulting pressure in the chamber C controls the relative positioning of the bushing 72 and the flange 72A with respect to the carrier 71 and the hub portion 71A. As the pressure in the chamber C increases, the hub portion 71A and flange 72A will be separated. That motion causes the race 120 to be moved to the right in FIG. 1, while the race 130 is moved to the left. An increase in the oil pressure in the chamber C thereby forces the outer input races 120 and 130 together and moves the drive balls 100 inward along the surface of the axially fixed outpu race 140. This change in the relationship of the races 120 and 130 with respect to the races 140 and 150 changes the speed changing ratio of the transmission 10 by moving the balls 100 inward and thereby increasing the resulting speed of the output shaft 60.

A decrease in the oil pressure in the chamber C causes a change in the speed ratio of the unit 10 in the opposite direction. As the pressure in C decreases, the races 120 and 130 are separated by the force of the preload spring 75, and the drive balls 100 which are moved outwardly along the surface of inner race 140, by the inner race 150 being forced against the drive balls 100 by the pressure regulator 200, as explained further below. The resulting speed of the output shaft 60 decreases.

The control valve assembly 90 is a self-centering valve that operates to maintain the selected speed ratio as set by the control dial 80. In this regard, FIG. 1 illustrates that the piston 91 is a spool piston provided with valve shoulders 91A, 91B and 91C. The cylinder 92 includes annular grooves 92A and 92B which have essentially the same width as the mating shoulders 91A and 91B on the spool valve. The groove 92B defines an outlet port through which the oil can be bled from the cylidner 92. The lateral positioning of the piston 91 is determined by the action of the spring 98 and the setting of the control cam 81. When the cam 81 is set so that the piston shoulder 91A is out of alignment with the groove 92A, the fluid being fed into the cylinder 92 at the groove 92A can flow through the passages 86 and 87, and into the chamber C. The oil pressure in the chamber C will increase under those conditions, and the races 120 and 130 will be moved together to change the speed changing ratio of the transmission. The lateral shifting of the race 120 and the bushing 72 also moves the bracket 93 for the valve 90 in the same direction. Thus, after a new position for the bushing 72 is established, and the speed changing ratio set, the shifting of the bracket 93 aligns the groove 92A with the spool shoulders 91A, and thereby blocks the flow of fluid into the chamber C. The valve system 90 is then in fluid balance, and the selected speed ratio is maintained substantially constant.

The separation of the race 120 away from the race 130 is accomplished by reversing the foregoing process. The dial 80 is rotated to position the cam 81 so that the piston 91 is shifted to the left in FIG. 1. This shifting exposes the groove 92B and permits the oil to bleed back into the sump 14 through the groove 92B. Thus, the oil pressure in the chamber C will be reduced, and the races 120 and 130 are separated. The speed reduction ratio of the unit is changed accordingly. The leftward shifting of the race 120 and the bushing 72 carries the bracket 93 in the same direction. The bracket 93 then reaches a balanced position by closing the groove 92B by means of the valve shoulder 91B. The speed ratio for the transmission is thereby maintained substantially constant for the new setting. The control valve assembly 90 operates to infinitely vary the speed ratio of the unit 10 within a selected speed range.

The specific manner in which the friction drive 70 functions to establish and vary the speed and the torque of the output shaft 60 is fully described in U.S. Pat. No. 3,229,538. Generally, in the illustrated embodiment the relationship of the input races 120 and 130, and the output races 140 and 150, determines the relative torque force transmitted from the input shaft 30 to the output shaft 60, and also determines the speed of the output shaft 60. The axial position of the left inner output race 140 is fixed in the unit 10. Any change in the relationship of the three remaining races hence will cause the drive balls 100 to shift position between the spacing rollers 110 so that the drive balls engage the races 120, 130, 140 and 150 at different effective contact diameters. The effective contact diameters for each speed setting determine the different speed ratios for the transmission 10. As the races 120 and 130 are shifted, the center of the balls 100 will move along a path parallel to the surface of the fixed inner race 140. In the illustrated embodiment, when the center of the balls 100 are axially aligned with the center of the arc for the fixed inner race 140 the speed ratio will be theoretically infinite, and the output speed of the shaft 60 will be theoretically zero. As the races 120 and 130 are separated, the balls 100 move outwardly and the output speed of the shaft 60 will be proportionately decreased. On the other hand, the movement of the races 120 and 130 together move the balls 100 inwardly, and result in a higher output speed for the shaft 60.

The transmission 10 in accordance with the present invention also includes an improved regulator system 200. The pressure regulator 200 functions to hydraulically connect the right inner output race 150 to the output shaft 60. The regulator 200 thereby permits the race 150 to transmit torque to the output shaft 60 in conjunction with the transmission of torque to the shaft 60 through the output race 140. Moreover, the pressure regulator 200 functions to apply a varying axial force against the race 150 to create a selected contact pressure between the races 120, 130, 140, and 150 and the drive balls 100. The contact pressure produced by the regulator 200 is substantially uniform during the operation of the transmission 10, and varies in magnitude as a function of changes in the torque load on the output shaft 160, the viscosity of the oil used in the transmission 10, and the coefficient of friction between the balls 100 and the races 120, 130, 140 and 150.

As indicated in FIGS. 2 and 3, the pressure regulator 200 includes a cylindrical hub 201 fitted on the output shaft 60. The hub 201 is free to rotate and siide axially with respect to the shaft 60. An annular flange 202 is integral with the hub 201. The end of the hub 201 receives the annular output race 150 in frictional engagement with the flange 202. The race 150 has a sufficient radial tolerance to permit the race 150 to be self-centering on the hub 201. The hub 201 also includes an oil passage 203 which is connected to the annular oil channel 68 defined by the input shaft 60 by means of a radial oil passage 69.

The pressure regulator 200 also includes an annular cylinder barrel 210. The barrel 210 is concentric with the hub 201 and is pinned to the flange 202 of the hub by means of suitable connecting pins 211. The barrel 210 therefore will rotate with respect to the shaft 60 in unison with the hub 201 and the connected output race 150. As indicated in FIG. 3, the axial movement of the barrel 210 is restrained by a thrust bearing 212 mounted on the shaft 60. The inner end of the barrel 210 is recessed to receive the flange 202 of the hub 201 in a manner which defines an annular fluid pressure chamber P therebetween. A compression spring 213 is positioned within the chamber P to constantly urge the hub 201 leftward in FIG. 3. The spring 213 thereby preloads the race 150 against the drive balls 100 during the operation of the friction drive 70. A suitable seal 214 provided on the hub flange 202 assures that the chamber P is fluid-tight.

The pressure regulator 200 also includes a plurality of piston members 220. As indicated in FIG. 2, in the preferred embodiment there are eight pistons 220 uniformly spaced around the cylinder barrel 210. Piston rings 221 seal the ends of the pistons 220 with respect to the cylinders 210A in the barrel 210. Each piston 220 also includes a drive roller 222 rotatably joined to the outer end of the piston by means of a roller pin 223. As seen in FIG. 3, each piston 220 includes a radial oil passage 224 which has an elongate inner portion 224A. The portion 224A is in fluid communication with an oil passage 204 provided in the cylinder barrel 210. The passage 204 is in fluid communication with the oil passage 203 provided in the hub 201.

Each of the pistons 220 further includes an axial oil bore 225 in communication with the radial bore 226. The outer end of the bore 225 is sealed by a suitable ball-type seal, and the inner end is connected by a radial bore 226 to a piston cylinder 210A provided in the cylinder housing 210 for each piston 220. As indicated in FIG. 3, a resilient valve ring 227 is provided around the end portion of the pistons 220 to provide a one way check valve for the port 226. Fluid pressure will cause the valve ring 227 to open and permit fluid to flow through the passages 224, 225, and 226, into the chambers 210A for each piston 220.

The piston barrel 210 also includes an oil port 228 provided in fluid communication with each of the cylinders 210A. The ports 228 connect each cylinder 210A with the common annular chamber P defined in the pressure regulator 200. A resilient valve ring 229 is provided within the chamber P adjacent the ports 228 and operates as a one-way check valve for the ports 228. The seal 229 permits the oil to flow from the ports 228 into the chamber P, but prevents any reverse or back flow from the chamber P.

As further indicated in FIG. 3, the piston barrel 210 also includes a continuous fluid bleed-off system 230. The system 230 includes an inlet port 231 connected directly to the common fluid chamber P for the cylinder 210A. The inlet port 231 is in fluid communication with an axial bore 232 which defines a fluid reservoir. A suitable oil filter 233 is positioned within the reservoir 232 to filter out any contaminants contained in the oil flowing through the pressure regulator 200. The bleed off system 230 also includes a bleed nozzle 234 having a selected cross-sectional area. The nozzle 234 is in constant fluid communication with the sump 14 by means of a conduit 235 provided on the outer end of the piston barrel 210.

The pressure regulator 200 also includes a safety valve system which responds to emergency conditions to relieve the pressure of the fluid within the chamber P and the other conduits of the pressure regulator. In this regard, as shown in FIG. 5, the regulator 200 includes a spring-loaded check valve assembly 240. The assembly 240 is in fluid communication with the chamber P through a port 241. A ball-type check valve 242 is positioned by a spring 243 and a set screw 244 to normally block the flow of oil from the chamber P through the port 241. However, if an undesirably high pressure is created in the fluid system the check valve 242 will be forced open by movement to the right in FIG. 5, and will relieve the pressure in the system by temporarily connecting the chamber P to the oil sump 14.

As shown in FIG. 3 and 4, the pressure regulator 200 also includes an annular cam member 250. The cam 250 is joined to the output shaft 60 by a key 251 so that the cam rotates in unison with the shaft 60. The left surface of the cam member 250 defines an annular cam track 252 having a selected configuration. As seen in FIG. 4, the preferred configuration for the cam track 252 is a surface including 3 uniformly spaced cam lobes 253 having substantially the same cam lobe amplitude and wave length. The cam track 252 is arranged in axial alignment with the piston rollers 222 provided in the pressure regulator 200. The rollers 222 will therefore roll on the track 252 and reciprocate the associated pistons 220 by a stroke equal to the amplitude A of the cam lobes 253.

During the operation of the pressure regulator 200, each outward suction stroke for the pistons 220 (to the right in FIG. 3) draws a charge of oil through the channels 68, 69, 203, 204, 224 225 and 226. The oil pressure opens the ring valve 227 and admits the oil into the piston cylinder 210A. The pressure of the oil which will be retained in the cylinders 210A will tend to urge the pistons 220 outwardly (right in FIG. 3) to retain the rollers 222 in frictional rolling engagement with the cam track 252.

As evident from FIG. 3 and 4, relative rotation of the piston barrel 210 with respect to the cam member 250 will cause the cam lobes 253 to engage the rollers 222 and drive the pistons 220 inward (left in FIG. 3) through a power or pumping stroke equal to the lobe amplitude A. Such pumping strokes force the oil charges in the cylinders 210A through the ports 228 and the ring valve 229 into the common fluid pressure chamber P.

The spaced pumping strokes of the plurality of pistons 220 assures that there is a constant flow of oil into the chamber P as a result of the operation of the pressure regulator 200. The regulator 200 hence applies an axial force against tee flange 202 of the hub 201 which urges the bushing 201 and the connected output race 150, toward the drive balls 100 (to the left in FIGS. 1 and 3). As seen in FIG. 3, the area of the portion of the hub flange 201 utilized to define the common fluid chamber P is substantial, and can be controlled by selecting a desired diameter for the hub flange 202. This substantial area diminishes the oil pressure needed in the chamber P to produce a desired axial force component against the flange 202 and the output race 150.

Due to the bleed-off through nozzle 234, the pressure regulator pump is operating with a certain speed in order to maintain oil pressure in the chamber P as a function of the torque applied to the right inner race 150. Since the area of the nozzle 234 is fixed, the flow through the nozzle 234 will increase as the pressure in the chamber P increases, or as the viscosity of the oil decreases. The flow will likewise decrease as the pressure in the chamber P decreases or the oil viscosity increases.

The pressure regulator 200 thereby defines a closed fluid system including the common pressure chamber P, the individual piston cylinders 210A and bleed-off system 230. Due to such a design, the pressure in the chamber P and hence the axial force on the race 150 can be closely controlled to provide the desired contact pressure between the balls 100 and races 120, 130, 140 and 150. The feeding of the oil from the eight pistons 220 into the common chamber P assists in maintaining a constant oil flow and pressure in the pressure regulator 200. Moreover, the closed fluid system and the use of a selected bleed nozzle 234 permit the regulator 200 to be designed so that the resulting pressure in the chamber P is uniform for any given condition of torque load on the output shaft 60 and viscosity of the oil in the transmission 10. The contact pressure on the balls 100 and races 120, 130, 140 and 150 will thus be uniform for a given opeating condition As shown in FIG. 4, the uniformity of pressure in the chamber P is accomplished by providing the cam track 252 with a cam profile that provides each piston with a parabolic axial displacement. The velocity of flow of the oil induced by each piston is thus a straight line function, as represented by the graph lines 'V' in FIG. 4. As illustrated by the line 'V,' the total flow velocity of the oil induced by the pumping action of all eight pistons 220 (as indicated by the "plus" area under line V in FIG. 4) plus the suction action of each piston (as indicated by the "minus" area under line V) is a constant value at all times during the operation of the pressure regulator 200.

The velocity of flow of oil into the common chamber P from the combined pumping action of the eight pistons 220 is hence uniform. Since the velocity of oil flow out of the chamber P through the fixed nozzle 234 also is uniform, the flow of oil through the chamber P will likewise be uniform, without any substantial flow ripples. The pressure regulator 200 will thereby maintain a uniform pressure in the chamber P, and a contact pressure on the balls 100 and races 120, 130, 140 and 150, for a given set of output torque and oil viscosity conditions.

During operation, the transmission 10 can be operated to drive the output shaft 60 at a speed which can be infinitely varied within a selected speed range. In the illustrated embodiment the friction drive transmission assembly 70 can be adjusted to vary the speed of the output shaft from zero to about 2½ times faster than the speed of the input shaft 30. In addition, the improved pressure regulator 200 in accordance with this invention responds to variations in the torque loading of the output shaft 60; the viscosity of the oil in the transmission; and the coefficient of friction between the balls 100 and races 120, 130, 140 and 150, to assure minimum slippage between the components of the friction drive transmission by adjusting the contact pressure between the races and the balls 100. Thus, the selected speed transmission ratio between the input shaft 30 and the output shaft 60 will be maintained, despite variations in the conditions of operation for the transmission 10.

The operation of the transmission 10 is begun by driving the input shaft 30 at a selected input speed. The control dial 80 is adjusted to provide a selected speed for the output shaft 60. The rotation of the input shaft 30 drives the pump 40 so that oil from the sump 14 is supplied to the control valve assembly 90 and the pressure regulator 300 through the above-described oil channels and passages. The drive races 120, 130, 140 and 150 are positioned by the valve assembly 90 in a relationship with respect to the drive balls 100 which establishes the selected speed transmission ratio for the unit.

The torque force applied to the outer input races 120 and 130 as a result of the rotation of the input shaft 30 is transmitted to the output shaft 60 through the inner output races 140 and 150. If the reaction torque applied to the balls 100 was the same for both output races 140 and 150, the transmission of torque by those races to the output shaft 60 would be the same, with 50 percent of the torque force being transmitted through each race, 140 and 150. However, the reaction torque, or the resistance to rotation, is less for the race 150 than with race 140. The race 140 is directly connected to the output shaft 60. In contrast, the race 150 is connected to the output shaft 60 through the hydraulic pressure regulator 200 which has a constant controlled oil bleed-off or leakage through the control nozzle 234. The torque transmitted through the race 150 is therefore less than the torque transmitted through the race 140, by the drive balls 100. The drive balls 100 thereby drive the races 140 and 150 at a slightly different speed, with the right race 150 rotating faster than the left race 140.

The differential speed between the races 140 and 150 can be clearly illustrated by the equations set forth below.

As well-known by those skilled in the art, the torque (T) transmitted to the shaft 60 by the races 140 and 150 is a product of the force (F) applied by each race and the radius (r) through which the force (F) acts - hence:

$$T = F \cdot r, \text{ and} \tag{1}$$

$$\Sigma T = F_L r_L + F_R r_R \tag{2}$$

where the subscripts (L) and (R) indicate the left race 140 and the right race 150, respectively.

Similarly, the horsepower (H)) transmitted to the shaft 60 by the drive balls 100 is a product of the speed of rotation (s) of each race 140, 150 and the torque $T$. Hence:

$$HP = T \cdot s, \text{ and} \tag{3}$$

$$\Sigma HP = T_L s_L + T_R s_R \tag{4}$$

where the subscripts (L) and (R) again represent the torque (T) through the left race 140 and right race 150, respectively, substituting equation (2) in equation (4), it is also evident that:

$$\Sigma HP = F_L r_L s_L + F_R r_R s_R \tag{5}$$

As explained in the above-mentioned U.S. Pat. No. 3,229,538, the friction drive transmission 70 adjusts to split the torque transmission between the races 140 and 150 so that a constant torque and horsepower is received by the output shaft for each speed setting. Thus, assuming that the total $\Sigma$ HP transmitted to the shaft 60 is a constant 100 percent;

$$\Sigma HP = 100 = F_L r_L s_L + F_R r_R s_R; \tag{6}$$

and since in the illustrated transmission 10 the contact radii (r) for each race 140 and 150 are the same, then:

$$100 = F_L s_L + F_R s_R \tag{7}$$

From equation (7) it is evident that as the torque force $F_R$ on the right race 150 decreases below the torque force $F_L$ on the left race $F_R$, the speed $s_R$ of the race 150 will exceed the speed $S_L$ of the race 140. This differential speed between the races 140 and 150 causes the race 150 to rotate with respect to the output shaft 60. The piston barrel 210, connected to the race 150, thereby rotates with respect to the cam 250, since the cam is connected to the shaft 60. The cam track 252 sequentially engages the rollers 222 and reciprocates the pistons 220.

The pistons 220 are reciprocated in the above fashion continuously during the operation of the transmission 10. The pistons 220 thereby continuously pump oil into the common chamber P, to replenish the oil continuously bled out of the chamber P through the nozzle 234. The oil pressure in the chamber P and the axial force on the race 150, are thus maintained or varied by the pumping action of the pistons 220. The pumping action of the pistons 220 thereby control the resultant contact pressure between the balls 100 and the races 120, 130, 140, and 150.

The pressure regulator 200 operates to vary the contact pressure between the races 120, 130, 140 and 150, and the balls 100, to transmit torque with minimum slip, in response to changes in the coefficient of friction between the balls 100 and races; variations in oil viscosity; or fluctuations in the torque load on the output shaft. Unnecessarily high pressures on the components of the transmission are therefore avoided.

For instance, if the transmission unit 10 is cold, the pressure regulator 200 will adjust the contact pressure between the balls 100 and races by compensating for the fact that the cold transmission oil has a high viscosity. The thicker oil will flow out of the chamber P through the nozzle 234 more slowly. Thus, the pumping action of the pistons 220 and the rotation of the race 150 with respect to the race 140 will be proportionately slower, since the oil in the chamber P need not be replenished as rapidly. The slower oil flow from the chamber P proportionately increases the pressure in the chamber. The contact pressure on the balls 100 and races is thereby increased to compensate for the increased slippage caused by the thicker, more viscious oil. As the viscosity of the oil decreases, the contact pressure decreases to adjust to the increased friction.

The pressure regulator 200 compensates in a similar fashion for changes in the coefficient of friction between the balls 100 and races 120, 130, 140 and 150 caused by such factors as surface conditions, oil viscosity changes, over-rolling friction forces on the balls as the ball rolling speed changes, and the like. As the friction between the contact surfaces decreases, the contact pressure created by the pressure regulator 200 must increase to assure a substantially non-slip operation for the friction drive assembly 70. As seen from equation (7) above, a decrease in the friction between the contact surfaces of the balls 100 and drive races causes more slippage and thereby diminishes the torque force $F_R$ applied to the right output race 150. Thus, the rotational speed $s_R$ increases, and the pumping action of the pistons 220 increases. The oil flow into the chamber P thereby increases, and the oil pressure in the chamber P increases proportionately. The decrease in friction hence increases the contact pressure on the drive balls 100 and races 120, 130, 140 and 150. An increase in friction between the drive surfaces operates in the reverse fashion to decrease the contact pressure. The pressure regulator 200 therefore adjusts the contact pressure in response to changes in the changes in the coefficient of friction of the transmission compoents.

The pressure regulator 200 also responds to changes in the output torque load on the shaft 60. As the torque load on the shaft 60 is increased, the wedging action of the cam 250 on the piston rollers 222 is proportionately increased. The pistons 220 thus exert an increased pressure on the oil in the cylidners 210A. The oil pressure in the common chamber P which is fed by the cylinders 210A is also increased, and causes a corresponding increase in the resulting contact pressure on the balls 100 and races 120, 130, 140 and 150.

The pressure regulator 200 operates in the above-described manner to vary the contact pressure on the components of the friction drive assembly 70 as a function of the operating conditions of the transmission 10. Substantially slipless transmission of torque will thereby occur through the friction drive assembly 70. Excessive pressures and friction forces are thus eliminated, and the efficiency and life of the transmission 10 are improved.

The magnitude of the pressure in chamber P, and hence the resulting contact pressure for the friction drive, can be accurately controlled due to the use of a sealed and closed fluid system in the pressure regulator. The use of eight sealed pistons 220 to feed oil under pressure to the common chamber P provides for a uniform oil flow at relative low pressures, particularly when the profile of the cam 252 follows the radii of the piston rollers 222, so that the displacement of the pistons 220 is parabolic. The shock loads and constant loads on the system components are thereby loosened, and the fluid sealing of the system is simplified. The use of the single nozzle 234 to continuously bleed the common chamber P also adds to the accuracy of control of the fluid pressure in the regulator 200. The single nozzle 234 can be made large in size so as not to require expensive machining, and to operate without clogging.

Although the invention has been described with a certain degree of particularity, it should be understood that the present disclosure has been made only by way of example. Consequently, numerous changes in the details of construction and the combination and arrangement of components as well as the possible modes of utilization, will be apparent to those familiar with the art, and may be resorted to without departing from the spirit and scope of the invention as claimed.

What is claimed is:

1. In a variable speed drive transmission including a drive shaft and a driven shaft with a ball and race frictional drive speed change mechanism having driving elements in frictional engagement drivingly interconnecting said shafts, a pressure regulator for automatically controlling contact drive pressures between said drive elements in accordance with the slippage between the drive elements and the torque loading of the driven shaft, said regulator comprising:
   a plurality of pistons positioned for reciprocation in sealed fluid cylinders;
   a common fluid pressure chamber connected to said cylinders by valve means to receive the fluid pumped by said pistons, said common chamber being arranged to apply contact drive pressures to said drive elements in proportion to the fluid pressure in said chamber;
   cam means joined to said driven shaft and arranged with respect to said pistons to sequentially drive said pistons through uniformly spaced pumping strokes to pump fluid from said cylinders into said common chamber at a substantially uniform rate of flow; and
   fluid nozzle means in fluid communication with said common chamber to continuously bleed fluid from said chamber at a flow rate in accordance with the pressure in said chamber and the viscosity of the fluid flowing therethrough;
   whereby said pressure regulator includes a closed fluid system which accurately controls the flow rate and pressure of the fluid flowing into said common fluid chamber to thereby accurately vary the contact pressures between said drive elements.

2. A variable speed drive transmission in accordance with claim 1 wherein said cam means and pistons are arranged to reciprocate said pistons with a velocity which provides a uniform rate of flow of fluid from said piston cylinders into said common fluid chamber.

3. A variable speed drive transmission in accordance with claim 2 wherein said pistons comprise cylindrical pistons sealed in said fluid cylinders by piston ring sealing means, with each piston including rolling means engaged with said cam means and further wherein said cam means is provided with a profile which drives said rolling means along a substantially parabolic path, so that the relative rotation of said cam means with respect to said pistons reciprocates said pistons in a manner which produces a substantially constant total fluid displacement from said cylinders into said common fluid chamber.

4. A variable speed drive transmission in accordance with claim 1 wherein said valve means comprises check valves provided in fluid communication between said cylinders and said common chamber.

5. A variable speed drive transmission in accordance with claim 4 wherein said pistons are arranged in an annular array adjacent said common chamber and wherein said valve means comrises a resilient annular valve ring arranged in fluid communication between said chamber and each piston cylinder and operative as a one-way pressure-activated check valve permitting fluid flow from said cylinders into said common chamber.

6. In a variable speed drive transmission including a drive shaft and a driven shaft, a friction drive interconnecting said shafts including a plurality of drive balls in frictional driving engagement with a pair of coaxial input races connected to said drive shaft and a pair of coaxial output races connected to said driven shaft with one of said output races being joined for rotation with said driven shaft and the other of said output races being rotatable with respect to said driven shaft, a pressure regulator for automatically controlling contact drive pressures between said drive balls and races in accordance with the slippage between the drive balls and races and the torque loading of the driven shaft, said regulator comprising:
   means defining an expandable fluid chamber positioned to apply a varying axial force to said rotatable output race to thereby vary the contact pressures between said drive balls and races;
   a cylinder barrel coaxially positioned on and rotatable with respect to said driven shaft;
   a plurality of pistons positioned in sealed cylinders defined in said cylinder barrel in a uniformly spaced array about said output shaft;
   valve means connecting each of said cylinders to said fluid chamber;
   cam means joined to said driven shaft and arranged with respect to said pistons so that said piston barrel rotates with respect to said cam means to sequentially reciprocate said pistons axially with respect to said driven shaft, said cam means including a cam profile which drives each of said pistons axially with a velocity which causes said pistons to pump fluid from said piston cylinders into said chamber at a substantially uniform rate of flow; and
   nozzle means in fluid communication with said common chamber to continuously bleed fluid from said chamber at a flow rate in accordance with the pressure in said chamber and the viscosity of the fluid flowing therethrough;
   whereby said pressure regulator includes a closed fluid system which accurately controls the flow rate and pressure of the fluid flowing into said common fluid chamber to thereby accurately vary the contact pressures between said drive balls and races.

7. A variable speed drive transmission in accordance with claim 6 wherein said pistons include rolling means engaged with said cam means and further wherein said cam profile is arranged to reciprocate each of said rolling means along a parabolic path so that the flow rate of fluid from said pistons into said common fluid chamber is uniform.

8. A variable speed drive transmission in accordance with claim 6 including eight axial pistons spaced uniformly in said piston barrel and wherein said cam means includes a plurality of axially-extending cam lobes spaced uniformly about said driven shafts and engagable with said pistons to reciprocate said pistons axially in said cylinder barrel.

9. A variable speed drive transmission in accordance with claim 8 wherein said cam means includes three uniformly spaced axially extending cam lobes having substantially equal lobe amplitudes and wave lengths.

10. A variable speed drive transmission in accordance with claim 9 wherein said valve means comprises an annular resilient valve ring arranged in fluid communication between said chamber and each piston cylinder and operative as a one-way pressure-activated check valve permitting fluid flow from said cylinders into said common chamber.

* * * * *